Feb. 13, 1951     H. E. SOMES     2,541,114
HARDENED METALLIC STRUCTURE
Filed Oct. 27, 1943
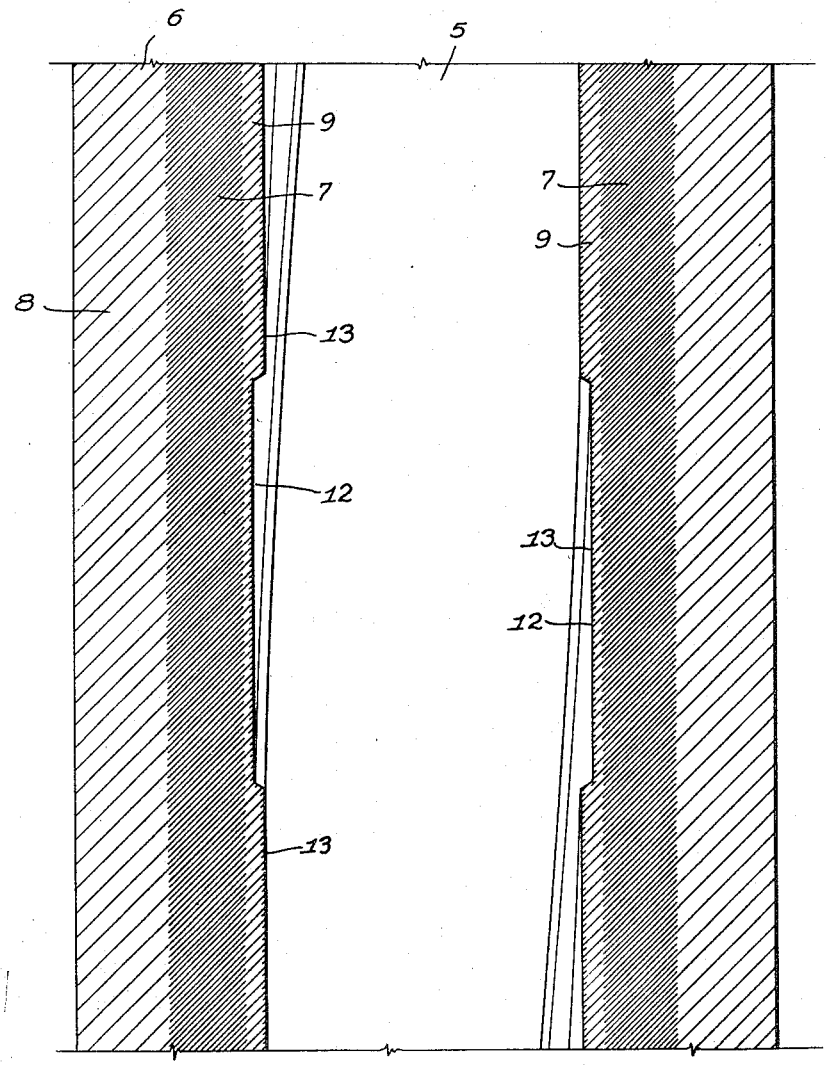
INVENTOR.
Howard E. Somes
BY
ATTORNEY Patented Feb. 13, 1951

2,541,114

UNITED STATES PATENT OFFICE 2,541,114

HARDENED METALLIC STRUCTURE

Howard E. Somes, Detroit, Mich., assignor, by mesne assignments, to The Ohio Crankshaft Company, Cleveland, Ohio, a corporation of Ohio Application October 27, 1943, Serial No. 507,782

5 Claims. (Cl. 89—14)

This invention relates to hardened metallic structures and particularly to tubular structures adapted to withstand sudden loads and high pressures.

An object of this invention is to provide a metallic structure, which is particularly adapted for use in tube form, constructed and arranged to provide an article of great resistance to suddenly applied loads and bursting pressures, in which trapped stresses are largely avoided, and which has a surface structure capable of increased resistance to failure under repeatedly applied loads.

The above and other objects which will be apparent are attained by the invention hereinafter described and illustrated in the accompanying drawing which shows a sectional view of a tubular metallic structure constructed in accordance with one embodiment of this invention.

The illustrated embodiment comprises a hardenable steel tube 5 having a cylindrical wall 6 the metal of which has been heat treated and quenched preferably in accordance with the method disclosed in my Patent No. 2,315,558, granted April 6, 1943, by which there is established a condition of "reversed auto-frettage," and also by which there is established an inner hardened layer 7 which, in the absence of a bursting pressure, is under residual tension, and an outer, relatively unhardened layer 8 which, in the absence of a bursting pressure, is under residual compression. As pointed out in my said patent, the ratio of the thickness of the hardened layer 7 to that of the unhardened layer 8 is greater than the ratio of the yield strength of the less hardened layer to that of the hardened layer.

A relatively thin layer 9 of the bore of the tubular structure 5 is provided of metal having a degree of hardness such as to permit machining of the surface of the bore. This is preferably obtained by quickly drawing the inner layer 9 by heating, for example, by electro-magnetic induction for approximately 1½ seconds, the heated layer being quenched either by the unheated body of the tube, or by an auxiliary quench of gas or liquid. This permits machining and finishing the bore of the tube. In this operation, the layer 9 is preferably drawn back to a hardness of approximately 29 to 32 Rockwell "C."

In the case of a gun tube the machining will include forming the rifling grooves 12 although it will be apparent that the form of the machined surface will vary in accordance with the use to which the tube is to be put. After machining the inner surface, the face of the bore is hardened by electro-magnetic induction heating and quenching, or the like, to form a thin, hardened surface layer 13 which is then drawn back to provide the optimum hardness required for the particular use to which the structure is to be put.

It will be obvious, where an inner layer is to be treated in accordance with this invention, that due allowance in the proportions of the hardened and unhardened areas 7 and 8 will be allowed for in the original tube.

It will be apparent that the invention can be variously modified and adapted within the scope of the appended claims.

What is claimed is:

1. A tubular metal member having an integral metal wall which throughout its extent is composed of a metal which is subject to heat-and-quench hardening, the wall including a first layer which is hardened and under pre-tension, a second layer immediately surrounding the first layer which is materially less hard than the first layer and under pre-compression, a third layer disposed interiorly of the first layer which is materially less hard than the first layer, and a fourth layer on the interior surface which is harder than the third layer.

2. A tubular metal member having a wall which throughout its thickness is composed of a metal which is subject to heat-and-quench hardening, said wall including integral inner and outer annular layers which are under pre-tension and pre-compression, respectively, said inner layer including inner and outer annular regions of low hardness and high hardness, respectively, and said outer layer being of materially less hardness than the outer region of the inner layer.

3. A tubular metal member which throughout its wall thickness is composed of a metal which is subject to heat-and-quench hardening and having grooves in the inner bore thereof, the wall of said member including an annular layer of relatively low hardness adjacent the bottoms of the grooves, an annular intermediate layer of relatively high hardness surrounding said first layer, and an outer layer immediately surrounding and having lower hardness than said intermediate layer.

4. A tubular metal member which throughout its wall thickness is composed of a metal which is subject to heat-and-quench hardening and having grooves in the inner bore thereof, the metal wall for a portion of the depth of the grooves and on the interior of the bore having a first layer of a relatively high degree of hardness, the wall also including an annular second layer of relatively low hardness adjacent the bottom of the grooves, an annular intermediate third layer of relatively high hardness surrounding said second layer, and an outer fourth layer of relatively low hardness surrounding said intermediate layer.

5. A tubular metal member which throughout its wall thickness is composed of a metal which is subject to heat-and-quench hardening and having grooves in the inner bore thereof, the surfaces of the portions between the grooves and the surfaces of the bottoms of the grooves comprising a first layer having a relatively high degree of hardness, the remainder of the depth of the portions between grooves and an adjacent annular zone of the wall beneath the grooves and the portions between them and comprising a second layer which is tough and ductile and of a relatively low degree of hardness, the wall having a third annular layer of relatively high hardness surrounding said second layer, and an outer annular fourth layer of relatively low hardness surrounding the third layer.

HOWARD E. SOMES.

REFERENCES CITED

The following references are of record in the file of this patent:

UNITED STATES PATENTS

| Number | Name | Date |
|---|---|---|
| Re. 14,820 | Sallows | Mar. 16, 1920 |
| 449,998 | Brustlein | Apr. 7, 1891 |
| 460,261 | Harvey | Sept. 29, 1891 |
| 930,927 | Berkstresser | Aug. 10, 1909 |
| 1,514,129 | Clark | Nov. 4, 1924 |
| 2,293,938 | Dunn et al. | Aug. 25, 1942 |
| 2,295,272 | Somes | Sept. 8, 1942 |
| 2,315,558 | Somes | Apr. 6, 1943 |

FOREIGN PATENTS

| Number | Country | Date |
|---|---|---|
| 363,323 | Great Britain | June 10, 1930 |
| 472,198 | Great Britain | Sept. 20, 1937 |